United States Patent [19]

Nickola et al.

[11] Patent Number: 4,628,004

[45] Date of Patent: Dec. 9, 1986

[54] POWDER METAL AND/OR REFRACTORY COATED FERROUS METAL

[75] Inventors: Richard A. Nickola, Munster; Brian A. Sok, Cedar Lake, both of Ind.

[73] Assignee: Inland Steel Company, Chicago, Ill.

[21] Appl. No.: 715,892

[22] Filed: Mar. 25, 1985

Related U.S. Application Data

[63] Continuation-in-part of Ser. No. 511,570, Jul. 7, 1983, Pat. No. 4,542,048.

[51] Int. Cl.$^4$ .................. B32B 27/38; B05D 3/02
[52] U.S. Cl. .................. 428/413; 427/383.7; 427/383.9; 427/386; 427/388.1; 427/405; 428/416; 428/418
[58] Field of Search .................. 427/386, 383.7, 383.9, 427/405, 388.1, 409, 410; 148/6.2; 428/413, 416, 418

[56] References Cited

U.S. PATENT DOCUMENTS 2,709,644  5/1955  Evans ........................... 427/386
4,157,924  6/1979  Elms et al. ..................... 148/6.2
4,228,203  10/1980 Yagi et al. .................... 427/383.9 X
4,391,855  7/1983  Geeck ........................... 427/383.7

Primary Examiner—Thurman K. Page
Attorney, Agent, or Firm—Marshall, O'Toole, Gerstein, Murray & Bicknell

[57] ABSTRACT

A ferrous metal strip is provided with a wet film coating of a powder metal, powder refractory material or a mixture thereof dispersed in a resin binder composition formed of a synthetic organic resin and a volatile solvent, followed by heating the coated strip to remove the solvent and cure the organic resin. The metal strip with the cured resin-powder flexible non-tacky coating can be subjected to varying heat treatments to provide a wide range of protective coatings having improved surface properties. The formability properties of the cured resin-powder coating is further improved by applying a surface coating of a dry lubricant, such as molybdenum disulfide or graphite, as a dry powder or as a dispersion in a fluid vehicle.

25 Claims, No Drawings

POWDER METAL AND/OR REFRACTORY COATED FERROUS METAL

This is a continuation-in-part of U.S. application Ser. No. 511,570, filed July 7, 1983 now U.S. Pat. No. 4,542,048.

The present invention relates generally to improved protective coatings on a ferrous metal base, and more particularly to a method of providing a ferrous metal strip with a protective coating of finely divided metallic or non-metallic refractory material dispersed in a resin binder and having improved formability and deep drawing properties.

Coatings containing finely divided metallic or non-metallic refractory material have heretofore been applied to ferrous metal strips by various methods to improve the resistance of the ferrous metal to oxidation, corrosion and similar stresses, to improve appearance, or to impart other useful properties, such as paintability or weldability to a ferrous metal strip. For example, it has also been proposed to form surface diffusion coatings of finely divided material on a ferrous metal base by applying a suspension of finely divided metal in a volatilizable organic material which serves as a carrier for the particles and to temporarily bind the particles on the metal strip until the strip is heated in a non-oxidizing atmosphere to effect removal of the organic binder and sintering or diffusion of the particles into the ferrous metal strip (U.S. Pat. No. 4,228,203). A film coating of a volatilizable organic material has also been used as the adhesive layer for particles which are dusted thereon, followed by compacting and heating sufficiently to form a sintered or diffusion coating (U.S. Pat. No. 3,954,460).

Protective coating on the surface of a steel strip, particularly coatings of finely divided metallic and non-metallic refractory material when produced by the previously developed procedures, lose much of their formability when the coatings are heated to remove the solvent and set the resin binder (i.e. effect curing), and such coatings are not satisfactory for coil coated steels or for use where the coated steel strip must be deep drawn. Coatings of hot-dip metallic aluminum or zinc, for example, are frequently given a surface coating of slushing oil to provide temporary protection against corrosion during storage and the slushing oil incidentally lubricates the surface so that the formability of the hot-dip coatings are improved, but when a slushing oil coating is applied over powder-resin coatings of the prior art, a large percentage of the powder protective metal coatings separates from the steel surface when the strip is deep drawn during fabrication at room temperature.

It is, therefore, an object of the present invention to provide an improved powder coated steel product and a process of forming an endless steel strip surface coating of finely divided metallic material or non-metallic refractory material dispersed in a cured thermoplastic resin binder characterized by having good formability and ductility.

It is also an object of the present invention to provide a ferrous metal strip with a surface coating of a powdered protective coating material which exhibits improved deep drawing properties.

It is a further object of the present invention to provide a ferrous metal with a surface coating containing finely divided metal powder or non-metallic refractory material or mixtures thereof dispersed in a cured thermoplastic resin binder characterized by improved deep drawing properties.

It is a further object of the present invention to provide an improved coated ferrous metal article and process of forming a ferrous metal strip having a protective surface coating of finely divided metallic or non-metallic refractory material dispersed in a resin binder which is flexible at room temperature and forms a dry coating which is free of distortions and bulges over a wide range of coating thickness.

Other objects of the present invention will be apparent to those skilled in the art from the detailed description and claims to follow.

The objects of the present invention are achieved by first providing on the clean surface of an endless ferrous metal article, such as a low carbon steel strip, a wet film coating comprising a solvent-resin binder solution containing a uniform dispersion of a finely divided protective metallic material, such as powdered metallic aluminum or a mixture of powdered zinc and aluminum, or a finely divided non-metallic refractory material, such as a porcelain enamel frit, and heating the wet film coated strip to a temperature sufficient to remove the solvent and cure the resin so as to form a dry film which is adherent to the metal strip, and which is non-tacky and formable at room temperature. The steel strip having the cured powder-resin coating is particularly adapted for making structures or parts which require deformation and deep drawing during fabrication and which are normally heated to an elevated temperature which effects removal of the resin and complete alloying of the coating with the steel base after the fabrication thereof, such as an automobile muffler or heat exchange tubes which are heated at an elevated operating temperature while in normal service and form a sinter or diffusion alloy surface coating in situ.

According to the present invention an improved formable adherent coating of finely divided protective coating material, such as a powdered metallic material or powdered refractory material, can be provided on the surface of a ferrous metal base, such as a cold rolled low carbon steel strip, by roll coating the steel strip with the finely divided metallic or refractory material uniformly dispersed in a fluid thermoplastic resin binder composition comprised of a volatilizable thermoplastic synthetic organic resin solubilized with a readily volatilizable organic solvent compatible with the resin so as to form a stable uniform fluid suspension of the finely divided protective coating material in the resin binder compositions.

The thermoplastic resins useful in forming compositions adapted to serve as the carrier and binder for the powder metal or ceramic particles on the surface of a ferrous metal base strip must have a hardness factor at ambient temperatures which provides a solid, flexible non-tacky, adherent coating on the surface of the steel strip after removal of the solvent. The thermoplastic resin also should be removable from the coating by volatilizing or decomposing into gaseous products, without leaving an objectionable residue on the steel strip when the coated strip is heated at an elevated temperature and should disintegrate completely even in an inert or reducing atmosphere when heated at a sintering or diffusion temperatures, such as 816° C. (1500° F.) and above, without leaving a significant residue in the coating. For example, the resin binder should be substantially volatilized (i.e. at least 90 percent of the resin should be volatilized) when the strip is heated in air at a temperature ranging between 340° C.–535° C. (644° F.–95° F.). The thermoplastic resins should have a Tukon hardness value between about 10 and about 22 and preferably between about 10–15 when the powder-resin coating is to be used in the "cured" state but can be between about 15 and 22 when the cured powder-resin coating is directly heated to form an article having an iron-metal diffusion alloy surface coating. The thermoplastic resins should also have a Glass Transition point (i.e. softening point) within a range from slightly above ambient or room temperature (i.e. about 35° C.) to about 180° C. so as to provide a dry, flexible coating which exhibits the degree of flexibility required for processing and handling without being tacky at ambient temperatures.

Thermoplastic resins which have the foregoing properties include the acrylic alkyl ester resins and bisphenol-A based resins such as phenoxy resins made from bisphenol-A and epichlorohydrin having a molecular weight between about 20,000 and 35,000. Suitable phenoxy type resin are the Bakelite ® phenoxy resins produced by Union Carbide Corporation, such as Bakelite Resin PKHH, having a molecular weight between about 25,000 and 30,000 and an apparent glass transition temperature between about 100° C. (212° F.) and 170° C. (338° F.). When the phenoxy resin Bakelite ® Resin PKHH is heated for 5 minutes at 890° F. or 15 minutes at 800° F. in an oxidizing atmosphere, 92 percent and 93.6 percent, respectively, of the resin is volatilized. Among the thermoplastic acrylic alkyl ester resins which are particularly adapted for use in the present invention are methyl methacrylate copolymer, ethyl methacrylate copolymer, methyl-butyl methacrylate copolymer, isobutyl methacrylate polymer and ethyl methacrylate copolymer. The preferred acrylic alkyl ester resin is ethyl methacrylate copolymer (Acryloid B-72), a product of the Rohm and Haas Company, and has a density of 1.15 g/cc, a Glass Transition temperature (i.e. softening point) of 40° C. (104° F.) and a Tukon Hardness of 10–11. When Acryloid B-72, is heated for 10 minutes at 600° F. or for 5 minutes at 700° F., 93 percent of the resin is volatilized.

Other synthetic organic resins which have properties similar to the herein disclosed thermoplastic resins can be used to form the resin binder composition for the powder coatings. For example, thermosetting polyester resins and mixtures of thermoplastic and thermosetting resins, such as a mixture of acrylic and epoxy resins, which have similar properties to the disclosed thermoplastic resins and which exhibit a degree of polymerization and cross-linking to form a flexible, non-tacky coating at ambient or room temperature after heating to effect volatilization of the solvent for the resin from the coating can be used to form the resin binder.

Among the suitable organic solvents for admixing with the thermoplastic acrylic alkyl ester resins and the phenoxy resins is Cellosolve acetate (2-ethoxyethyl acetate) which is used in an amount required to form a fluid composition having a viscosity to provide a coating of the desired thickness when used in the selected coating procedure. Other volatile organic solvents which are preferably adapted to be removed by heating at a temperature between about 30° C. and about 274° C. (86° F.–525° F.) and which have similar properties can be used, such as methyl ethyl ketone, methyl isobutyl ketone, methyl Cellosolve acetate or commercially available solvent blends (i.e. the mixture Cellosolve acetate-Cellosolve solvent-methyl ethyl ketone).

The finely divided or powder protective metal coating materials which can be used in the present invention include: zinc, iron-zinc mixtures and alloys, aluminum, aluminum-zinc mixtures and alloys, aluminum-silicon mixtures or alloys, iron-aluminum mixtures and alloys, copper, brass, bronze, cupro-nickel mixtures and alloys, duronickel, nickel-chromium mixtures and alloys, iron-chromium mixtures and alloys and stainless steel. Fillers and protective pigments, such as hexavalent chromium compounds, can also be added to a powder protective metal coating material of the present invention to control welding properties, improve salt fog corrosion resistance and impart other desirable properties to the protective coating.

The finely divided non-metallic refractory coating materials which can be applied to a ferrous metal strip in accordance with the present invention include finely ground ceramic materials, such as an enamel ground coat, an enamel frit, porcelain enamel frit, glass frit (ground coat) and similar finely divided refractory materials normally used to form protective or decorative coatings on a ferrous metal strip or sheet by heating the coating to a fusion or sintering temperature. Powdered metal can also be mixed with the finely divided ceramic material to form cermet-resin coatings and sintered cermet coatings.

The powdered protective metallic or refractory material suspended in a fluid resin binder composition can be applied to a ferrous metal strip by any suitable coating procedure, including spray coating, immersion coating and roll coating.

Where the powder coated steel strip is to be used in the dry or "as cured" form (i.e. heated sufficiently to remove the solvent but without removal of the resin), the cured coating typically has a composition of about 50 percent by volume resin, such as the preferred thermoplastic acrylic alkyl ester resins or phenoxy-type resins, and about 50 percent by volume of finely divided coating materal, such as powdered metallic aluminum. Higher concentrations of metal powder or refractory powder can be used where deep drawing properties are not required in the coated strip or where the cured or dry resin-powder coating is heated to form an iron-protective metal diffusion alloy surface coating. Where the coated steel strip is intended to be provided with a sintered or single phase iron-protective metal diffusion alloy surface coating, the coating solution should preferably contain about 12 to 20 percent by volume resin and 80 to 88 percent by volume powder on a solvent free basis. The formability and corrosion or oxidation protection provided by the coatings depends on the coating composition, the coating aluminum thickness and the condition used to process the coating.

In order to provide the cured coated material with the improved deep drawing properties which permit severe deformation during fabrication without causing coating separation, the cured coating is provided with an ultra thin surface coating of a solid dry lubricant, such as graphite, molybdenum disulfide, soap-borax mixture or a fatty acid lubricant. A solid ultra thin film of a dry lubricant on the surface of the thermoplastic resin-powdered metal coating has been found to very significantly improve the deep drawing formability of the cured powder-resin coating. The film of solid dry lubricant is applied to the surface of the coating by any conventional coating method, including spray coating, electrostatic coating, immersion coating and roll coating. The solid dry lubricant is preferably applied as a suspension of finely divided particles in an aqueous or other volatilizable vehicle, and the coating is dried by heating in an oven or by passing the coated strip continuously through a heating zone.

The powdered metal coating material can also be admixed with finely divided ceramic material to form "cermet" coatings in the above described manner. Fillers and pigments, such as zinc chromate, can also be added to a powder metal coating mixtures of the present invention to control welding properties and improve salt fog corrosion resistance of the coatings.

The steel base commonly used in the present invention is a cold roll low carbon steel, and preferably but not necessarily an aluminum killed steel, which has a carbon content not above about 0.25 weight percent maximum and preferably having between about 0.001 weight percent carbon to about 0.1 weight percent carbon. An aluminum killed low carbon steel will generally contain between about 0.01 to 0.08 weight percent carbon, about 0.3 to 0.8 weight percent manganese, a maximum of about 0.03 weight percent sulfur, a maximum of about 0.015 weight percent phosphorus, about 0.05 weight percent silicon, a maximum of about 0.10 weight percent aluminum, and the balance being essentially iron with the usual amounts of residual impurities. If the steel is vacuum degassed, the concentration of all metalloids and residuals in the steel are maintained at a very low level. A typical low-carbon aluminum killed steel which can be used in the present invention is a cold rolled steel strip having the following approximate composition on a weight basis: Carbon 0.05 percent, Manganese 0.25–0.50 percent, Sulfur 0.030 percent, Phosphorous 0.02 percent, Silicon 0.05 percent, Aluminum 0.030 percent, to 0.090 percent, and the balance essentially iron and incidental impurities.

The present invention is particularly useful for providing a uniform aluminum coating on a low carbon aluminum killed steel strip which contains as an alloying element, a small amount of a strong oxide forming metal, such as titanium, in an amount between about 0.1 wt. percent and about 1.0 wt. percent. Low carbon low alloy steels containing strong oxide formers as the essential alloying element are difficult to provide with a continuous, uniform, hot-dip aluminum coating which has good resistance to high temperature oxidation and/or corrosion by conventional continuous coating procedure.

The surface of a steel strip to be coated must be thoroughly cleaned by any conventional methods of removing rolling oils and other contamination from the surface of the steel strip before coating the strip with the powder-resin material of the present invention. More particularly the strip can be cleaned with a degreasing solvent and/or by applying an alkaline cleaning solution and brushing. The cleaning solution is preferably heated to a temperature of between about 65° to 80° C. (149° F. to 176° F.). Any conventional cleaning brush can be used, such as a Scotch-Brite brush, and the brushing can be carried out using either hot water or heated alkaline cleaning solution. After alkaline cleaning the surface of the steel strip, the strip is thoroughly rinsed and dried before coating the strip with the powdered metal-thermoplastic resin binder composition.

As a specific illustration of producing a cured powder metal-resin coated steel strip by the process of the present invention, a strip of cold rolled aluminum killed low carbon steel having a carbon content of 0.05 wt. %, a thickness of about 2 mm. and a width of about 1050 mm. was continuously immersed in an alkaline cleaning bath while travelling at a line speed of about 0.60 meters per second. The alkaline cleaning bath contained about 15 mg per liter (2 oz. per gal.) "Parker 356 Cleaner" heated to a temperature of between 60° C. –77° C. (150° F.–170° F.). The strip leaving the alkaline cleaning bath was then continuously wet brushed with a Scotch-Brite brush operating at 75% of full load capacity. The stip was again passed through an alkaline cleaning bath of identical composition and temperature and thereafter spray rinsed with water at a temperature of 16° C.–27° C. (60° F.–80° F.), and dried with an air knife at 60° C. (140° F.). In some runs the strip was contacted with a 3% aqueous solution of $H_2SO_4$ at about 47° C. (115° F.) before the final rinse.

The clean strip was roll coated in a conventional manner with a fluid coating composition prepared by dispersing aluminum metal powder (Reynolds-511) having an average particle size of about 9–13 microns uniformly in a thermoplastic resin binder composition in amounts which provide after curing a dry film composed of about 67 wt. percent (about 48 volume percent) aluminum metal powder and about 33 wt. percent (about 52 volume percent) thermoplastic resin. The thermoplastic resin binder composition was formed of ethyl methacrylate copolymer (Acryloid B-72, a product of the Rohm & Haas Company), containing Cellosolve acetate solvent in a ratio of 40 grams resin to about 170 ml.(6 oz.) solvent to provide a coating composition having a viscosity of 0.57 Pa.S (43 seconds #4 Zahn) and having 38.2 percent volume total solids. The ethyl methacrylate copolymer resin had a Tukon hardness value of about 10–11, and a Glass Transition temperature of about 40° C. The solvent was admixed to adjust the viscosity of the composition to provide the desired coating thickness for the roll coating line and the ratio of metal powder to resin was selected to provide the desired concentration of metal in the coating.

The foregoing powdered aluminum-resin binder fluid coating composition was applied to both surfaces of the strip by conventional roll coating procedure at a first coating station and the coating cured in the first heating oven where the strip was heated at a temperature ranging between about 177° C. and 279° C. (350° F. and 535° F.), and preferably to a peak metal temperature between 207° C. to 212° C. (405° F. to 415° F.) as measured at the exit end of the heating oven to effect complete removal of the volatile Cellosolve acetate organic solvent from the coating and set the resin but without removing or degrading the resin binder and providing a cured dry coating having a thickness of about 30.5 μm (1.2 mils). Where the coated strip is to be immediately heat treated in-line to form an alloyed surface coating, as hereinafter described, the resin coated strip need not be heated to a temperature of 207° C. but only heated sufficiently to substantially remove the solvent (i.e. as low as about 150° C.). Thereafter, during this run the viscosity of the coating system was reduced by adding to the coating bath an amount of Cellosolve acetate solvent which provided in the above manner coated material having a dry coating thickness of about 20.0 μm (0.8 mils). Similar coating solutions were prepared which provided coatings having a dry coating thickness from about 12.7 μm (0.5 mil) to 50.8 μm (2.0 mil). The stability of the fluid powdered aluminum coating systems was excellent, since the coating compositions were used over an 8 hour period without any separation problems occurring. During the foregoing runs no problems were noted in applying the aluminum coating to the surfaces of the steel strip by the roll coating procedure.

As a further example of producing a cured powder metal-resin coated low titanium alloy low carbon steel, a low-carbon aluminum killed full hard steel strip containing about 0.03 wt. % carbon and about 0.4 wt. % metallic titanium with 0.09 wt. % aluminum and the usual amounts of manganese, sulfur, phosphorous, silicon and incidental impurities was cleaned and roll coated in the following manner. Prior to the run, the resin binder (R&H Acryloid B-72) and the solvent (Cellosolve acetate) were mixed in the ratio of 195 g of binder to 1 dm$^3$ of solvent (1.625 lbs of binder to 1 gal of solvent, and 110 dm$^3$ (29 gal) of the binder/solvent solution were put in a 208 dm$^3$ (55 gal) drum along with 154 kg (340 lb) of aluminum metal powder (Reynolds Aluminum R-400). The binder/solvent solution and aluminum powder were thoroughly mixed in the drum before pumping the dispersion into the roll coating pans. The viscosity of the dispersion was adjusted with Cellosolve acetate to 0.26–0.30 Pa S (21–24 seconds #4 Zahn). After adjustment, the wet film coating mixture contained 42.0% total volume solids. The preferred dry film coating which is formed after removal of the solvent contains 90.1 wt. % aluminum powder and 9.9 wt. % resin binder (i.e. 90:10 ratio) and has a dry film thickness of 22.9 μm (0.9 mils). Before roll coating the steel strip was cleaned using the following sequence: (1) Alkaline spraying with a 1.21 kg/m$^3$ (2.5 oz/gal) solution of "Parker No. 338" cleaner at 65.5° C. (150° F.); (2) Wet brushing; (3) Alkaline spraying with a 0.997 kg/m$^3$ (2.0 oz/gal) solution of "Parker No. 338" cleaner at 65.5"C. (150° F.); (4) Pickling with a 3% aqueous H$_2$SO$^4$ solution at 47.7° C. (118° F.); (6) Rinse spraying with water at 60° C. (140° F.); and (7) Drying.

The aluminum powder coating was applied by roll coating two sides of the strip at the finish coater station and then drying and curing the coating. Temperature tapes, contact pyrometer and Ircon infrared instrumentation were used to control the oven temperature to obtain a peak metal curing temperature suitable for processing and acceptable coating adhesion. Depending on line conditions, peak metal temperatures between 193.3° C. and 210° C. (380° F.–410° F.) and preferably at about 207° C. were maintained during the processing as measured by the Ircon infrared non-contact temperature sensing device using an emissivity setting of 0.73.

During setup for the run, it was noted that coating transfer occurred at the first support contact roll on the bottom side of the strip after the curing oven. This was caused by inadequate cooling time prior to contact with the roll. Therefore, the coating on the strip bottom side was limited to a maximum thickness of 38.1–40.6 μm (1.5–1.6 mils) wet film thickness which provided a 25.4 μm (1.0 mil) dry film thickness. Water sprays were applied to the bottom side of the strip to eliminate coating transfer to the contact roll after the curing time. Dry coatings between about 12.7 μm (0.5 mil) and 38.1 μm (1.5 mil) were produced in the foregoing run.

A powder metal-resin coated steel strip having a composition similar to a "Zincrometal" coating (i.e. a zincchromate product of the Diamond Shamrock Corporation of Cleveland, Ohio) was also produced by roll coating as described herein using as the powder material a mixture of metallic zinc powder and chromium oxides (CrO$_3$/Cr$_2$O$_3$) powder which was mixed with Acryloid B-72 thermoplastic resin in a proportion of about 86 wt. percent of the zinc-chromate powder mixture to about 14 wt. percent of the thermoplastic resin, such as Acryloid B-72.

A ferrous metal strip can also be provided with a multiple powdered metal coating comprising a prime or undercoating of one powdered metallic material, such as zinc, and a finish or surface coating of second powdered metallic material, such as aluminum. The ferrous metal strip is cleaned as described herein or in any conventional manner and provided with the first coating comprising a suspension of powdered metallic zinc in a thermoplastic resin, such as ethyl methacrylate copolymer, having the above specified properties in a ratio of about 70 wt. % (about 50 volume percent) powdered zinc and about 30 wt. % (about 50 volume percent) resin on a dry basis, and containing sufficient Cellosolve acetate solvent to reduce the viscosity sufficiently to permit forming a uniform fluid suspension of the powdered zinc, and applying the fluid suspension to an endless low carbon cold rolled steel strip by roll coating to provide a dry coating having a thickness of about 15.2 μm (0.6 mils) after heating at a peak temperature between 207° C.–212° C. (405° F.–415° F.) to remove the solvent and effect curing. The powdered zinc coating is smooth, non-porous ductile and provides good salt fog resistance. A powdered aluminum metal coating is applied directly to the dry zinc coating in the same manner as previously described for applying a powder aluminum coating followed by heating at a peak temperature of between 177° C. and 279° C. (350° F. and 525° F.) to remove the solvent and set or cure the resin in the outer coating. The coatings can be temper rolled to provide a smooth impervious surface having good oxidation resistance.

An improved protective refractory coating is also provided on a clean surface of a steel panel or strip by the process of the present invention using a fluid suspension comprising a dispersion of finely divided glass frit, Acryloid B-72 resin, and Cellosolve acetate solvent so as to provide after removal of the solvent a thin dry coating having a thickness between about 15.2 μm (0.6 mil) and about 30.5 μm (1.2 mil). By roll coating a first coating a steel strip using a resin to glass frit ratio of about 35 parts by wt. of the resin to 65 parts by wt. glass frit followed by applying a conventional white enamel top coating and firing at a temperature of 1460° F. for 4 minutes a composite refractory coating is formed which passes the Olsen Button Test with a rating of about 10, where "O" represents 100% coating removed after taping and "10" represents no coating removed after taping. The glass frit containing the following ingredients is prepared by heating the following several specified ingredients or their equivalents to a temperature of about 1010° C. (1850° F.) for about 5 minutes, quenching in water, and grinding to a very fine powder:

| | | |
|---|---|---|
| Borax Glass | 52.4 | grams |
| Lead Oxide | 5.3 | grams |
| Calcium Carbonate | 16.0 | grams |
| Barium Oxide | 10.9 | grams |
| Alumina (Al$_2$O$_3$) | 11.0 | grams |
| Sodium Carbonate | 19.8 | grams |
| Silica (SiO$_2$) | 1.7 | grams |

The glass frit can also be mixed with metallic aluminum powder or other powdered protective metal in a ratio of about 35 parts by wt. glass frit to about 65 parts by wt. metallic powder, and a suspension thereof in Acryloid B-72 resin applied to a steel panel in the same manner as described herein to provide a formable cermet coating.

In the further embodiment of the present invention where the cured powder-resin coatings must be subjected to deep drawing or frictional deformation during fabrication the adherence of the resin-powder metal coatings is greatly improved by applying a very thin surface coating of a dry film lubricant to the cured thermoplastic resin-powder coatings (i.e. after removing the solvent but before removal of the resin binder). The dry film lubricant is preferably formed by applying a lubricant composition over the cured resin coating in the form of an ultra thin film of a lubricant material dispersed in a volatilizable liquid which when removed leaves a thin dry surface lubricating film. The General Motors (GM) Double Draw Test is commonly used to evaluate the ability of protective metal coatings on a ferrous metal strip to withstand substantial surface abrasion applied by a deforming tool without causing the coating to separate from the steel base.

In the following Table I the effectiveness of applying the herein disclosed dry film lubricant coating is demonstrated by comparing the percentage of the powder coating removed when a steel strip having the indicated coating thereon is subjected to the General Motors Double Draw Test when the dry film used is: (1) Molybdenum disulfide, (2) Graphite, (3) a slushing oil, and (4) no lubricant coating on several powder coatings. The data give the average results:

TABLE I

PERCENTAGE OF CURED COATING REMOVED BY GM DOUBLE DRAW TEST

| POWDER COATING | TYPE OF LUBRICANT USED | | | |
|---|---|---|---|---|
| | Molybdenum Disulfide | Graphite | Slushing Oil | No Lubricant |
| Thickness: Aluminum-Resin[1] | | | | |
| A - 15 μm | 0% | 0% | 100% | 100% |
| B - 30 μm | 4 | 0 | 100 | 100 |
| Zinc-Resin[2] | | | | |
| C - 15 μm | 0 | — | 40 | 60 |
| D - 30 μm | 0 | — | 40 | 60 |
| E - 45 μm | 0 | — | 40 | 60 |
| F - 55 μm | 0 | — | 40 | 60 |
| G - Zincrometal[3] | 0 | 0 | 5 | 30 |
| H - Zincoreloy[3] | 0 | 0 | 2 | 5 |

[1]Thermoplastic resin-aluminum powder coating as produced herein.
[2]Thermoplastic resin-zinc powder coating as produced herein.
[3]Commercial zinc-rich paints.

Although titanium is the essential alloying element to be added to the low carbon steel where good room temperature formability and oxidation resistance at temperatures above about 677° C. (1250° F.) is required, it is also within the scope of the invention to add small amounts of other metallic alloying elements, such as molybdenum or columbium, to improve the physical properties of the base steel. However, the secondary alloying elements should not impair the oxidation resistance of the steel, and the amount of secondary alloying elements preferably should not exceed about 2 percent by weight of the steel. Thus, the base steel of the present invention is in every instance a low alloy low carbon steel.

In the specification and claims the term "powder aluminum" or "aluminum coating", where the context does not require otherwise, designates finely divided metallic aluminum and metallic aluminum containing minor amounts of other metals, such as between about 5 to 12 wt. % silicon, which do not significantly reduce the oxidation resistance characteristic of an aluminum base coating. Also, the term "ferrous metal" as used in the specification and claims designates a low carbon steel and low alloy steel wherein the added alloying element or elements which are not normally present in a low carbon steel do not exceed a total of about 2 wt. % of the steel.

The present invention comprises a process for providing metal strips having a ferrous metal base with improved protective resin-powder coatings which are useful in the cured resin state and which can be further processed or when heated to an elevated temperature in use provides a ductile, impervious protective metal coating, such as a metallic sinter coating or a solid solution iron-aluminum diffusion alloy coating, and is uniquely adapted for producing in an economical manner with conventional equipment a wide range of coated strip material using relatively inexpensive material which can be used in place of more expensive coated steel and alloy sheet material.

We claim:

1. A method of providing a ferrous metal strip with a ductile adherent protective coating having improved deep drawing properties comprising;
    (a) applying to a clean surface of the ferrous metal strip a uniform fluid coating of a finely divided protective coating material selected from the group consisting of powdered protective metal and nonmetallic refractory material uniformly dispersed in a solution of a synthetic resin binder solubilized with an organic solvent which is volatilized at a temperature between about 30° C. (86° F.) and about 274° C. (525° F.);
    (b) said resin binder being adherent to said surface of the metal strip and having a Tukon hardness range of between 10 and 15 and a glass transition temperature which is between about 35° C. and 180° C. (95° F. and 356° F.) and said resin binder comprising between about 10 volume percent and 50 volume percent of said coating on a solvent free basis with the balance being powdered protective coating material;
    (c) heating the fluid coated metallic strip to remove said volatile solvent and set the resin binder to provide a dry cured resin-powder protective coating on the surface of said ferrous metal strip which is formable at room temperature and exhibits deep drawing properties;
    (d) and said resin-powder coated ferrous metal strip characterized by forming an adherent formable resin free protective coating on said strip when said strip is heated to a sintering and diffusion temperature.

2. A method as in claim 1, wherein said resin binder is a thermoplastic acrylic alkyl ester resin selected from a group consisting of methyl methacrylate copolymer, ethyl methacrylate copolymer, methyl/butyl methacrylate copolymer, and isobutyl methacrylate polymer.

3. A method as in claim 2, wherein said thermoplastic acrylic alkyl ester resin is ethyl methacrylate copolymer resin having a Tukon hardness value between 10 and 11 and a glass transition temperature of about 40° C. (104° F.).

4. A method as in claim 1, wherein said resin binder is a phenoxy-type resin reaction product of bisphenol-A and epichlorohydrin having a molecular weight between about 20,000 and 35,000.

5. A method as in claim 1, wherein said resin binder is a phenoxy resin having a molecular weight of between about 25,000 and 30,000 and a glaws transition temperature of between about 100° C. (212° F.) amd 170° C. (338° F.).

6. A method as in claim 1, wherein said finely divided protective coating material is a powdered metallic material selected from the group consisting of zinc, iron-zinc mixtures, aluminum, aluminum-silicon mixtures, iron-aluminum mixtures, copper, brass, bronze, cupro-nickel, duro nickel, chromium, nickel-chromium, iron-chromium, finely divided hexavalent chromium compound and stainless steel which comprises between about 70 and 95 wt. percent of said dry cured protective coating.

7. A method as in claim 6, wherein said ferrous metal strip is selected from a group consisting of a low carbon aluminum killed steel and a low titanium aluminum killed low carbon steel.

8. A method as in claim 7, wherein said protective coating is comprised of between about 70 and 95 wt. percent powdered metallic aluminum having an average particle size of between about 9 and 13 microns with the balance essentially said thermoplastic resin.

9. A method as in claim 1, wherein said protective coating material is a finely divided ceramic material selected from the group consisting of enamel frit, enamel ground coat and porcelain enamel frit.

10. A method as in claim 1, wherein said ferrous metal strip is a low titanium aluminum killed low carbon steel strip and said cured thermoplastic resin-powder coating is formed of metallic aluminum powder dispersed uniformly in said thermoplastic resin.

11. A method as in claim 1, wherein a dry solid lubricant dispersed in a fluid volatilizable vehicle is applied to the surface of said cured resin-powder coating, and said coating is heated to remove said vehicle and provide a thin dry lubricating film on the surface of said cured resin-powder protective coating.

12. A method as in claim 11, wherein said dry solid lubricant is selected from the group consisting of graphite, molybdenum disulfide, soap-borax mixture, and fatty acid lubricant.

13. A coated ferrous metal strip when made by the process of claim 1.

14. A coated ferrous metal strip consisting of a low carbon steel strip with a formable surface coating of a thermoplastic resin having uniformly dispersed therein a finely divided protective powder coating material having a thickness of between 12.7μ (0.5 mil) and 50.8μ (2.0 mil), said coating material selected from the group consisting of powdered protective metal and a non-metallic refractory material with said coating material and resin mixed in a proportion of between about 10 and 50 volume percent of said resin and 90 to 50 volume percent of said powder coating material, said thermoplastic resin having a Tukon harness range between 10 and 15 and a glass transition temperature between 35° C. and 180° C. so as to provide a non-tacky surface coating having good room temperature formability, and said resin-powder coated ferrous metal strip characterized by forming an adherent formable resin-free protective coating on said strip when said strip is heated to a sintering and diffusion temperature.

15. A coated ferrous metal strip as in claim 14, wherein said resin is a thermoplastic acrylic alkyl ester resin selected from a group consisting of methyl methacrylate copolymer, ethyl methacrylate copolymer, methyl/butyl methacrylate copolymer, and isobutyl methacrylate polymer.

16. A coated ferrous metal strip as in claim 15, wherein said thermoplastic acrylic alkyl ester resin is ethyl methacrylate copolymer resin having a Tukon hardness value between 10 and 11 and a glass transition temperature of about 40° C. (104° F.).

17. A coated ferrous metal strip as in claim 14, wherein said resin binder is a phenoxy-type resin reaction product of bisphenol-A and epichlorohydrin having a molecular weight between about 20,000 and 35,000.

18. A coated ferrous metal strip as in claim 14, wherein said resin is a phenoxy resin having a molecular weight of between about 25,000 and 30,000 and a glass transition temperature between about 100° C. (212° F.) and 170° C. (338° F.).

19. A coated ferrous metal strip as in claim 14, wherein said finely divided protective powder coating material is a powdered metallic material selected from the group consisting of zinc, ionr-zinc mixtures, aluminum, aluminum-silicon mixtures, iron-aluminum mixtures, copper, brass, bronze, cupro-nickel, duro nickel, chromium, nickel-chromium, iron-chromium, finely divided hexavalent chromium compound and stainless steel which comprises between about 70 and 95 wt. percent of said dry cured protective coating.

20. A coated ferrous metal strip as in claim 19, wherein said ferrous metal strip is selected from a group consisting of a low carbon aluminum killed steel and a low titanium alloy aluminum killed low carbon steel.

21. A coated ferrous metal strip as in claim 20, wherein said protective coating is comprised of between about 70 and 95 wt. percent powdered metallic aluminum with the balance essentially said thermoplastic resin.

22. A coated ferrous-metal strip as in claim 14, wherein said steel strip is a low titanium alloy aluminum killed low carbon steel strip and said cured thermoplastic resin-powder coating is formed of metallic aluminum powder dispersed uniformly in said thermoplastic resin.

23. A coated ferrous metal strip as in claim 14, wherein said protective coating material is a finely divided ceramic material selected from the group consisting of enamel frit, enamel ground coat and porcelain enamel frit.

24. A coated ferrous metal strip as in claim 14, wherein said resin-powder coating has a surface coating of a dry solid lubricant.

25. A coated ferrous metal strip as in claim 24, wherein said dry solid lubricant is selected from the group consisting of graphite, molybdenum disulfide, soap-borax mixture, and fatty acid lubricant.

* * * * *